Dec. 19, 1939.　　　F. A. BARNES　　　2,184,163

PRESSURE GAUGE

Filed June 10, 1937　　　3 Sheets-Sheet 1

Inventor
FREDERICK A. BARNES
By Raymond D. Jenkins,
Attorney

Dec. 19, 1939.   F. A. BARNES   2,184,163
PRESSURE GAUGE
Filed June 10, 1937   3 Sheets-Sheet 2
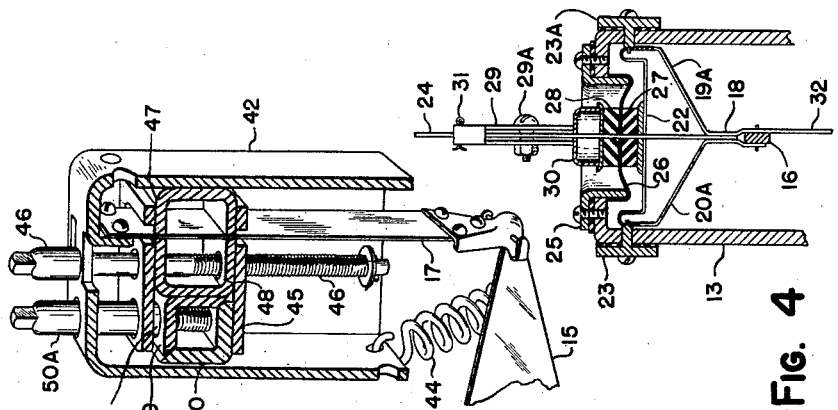
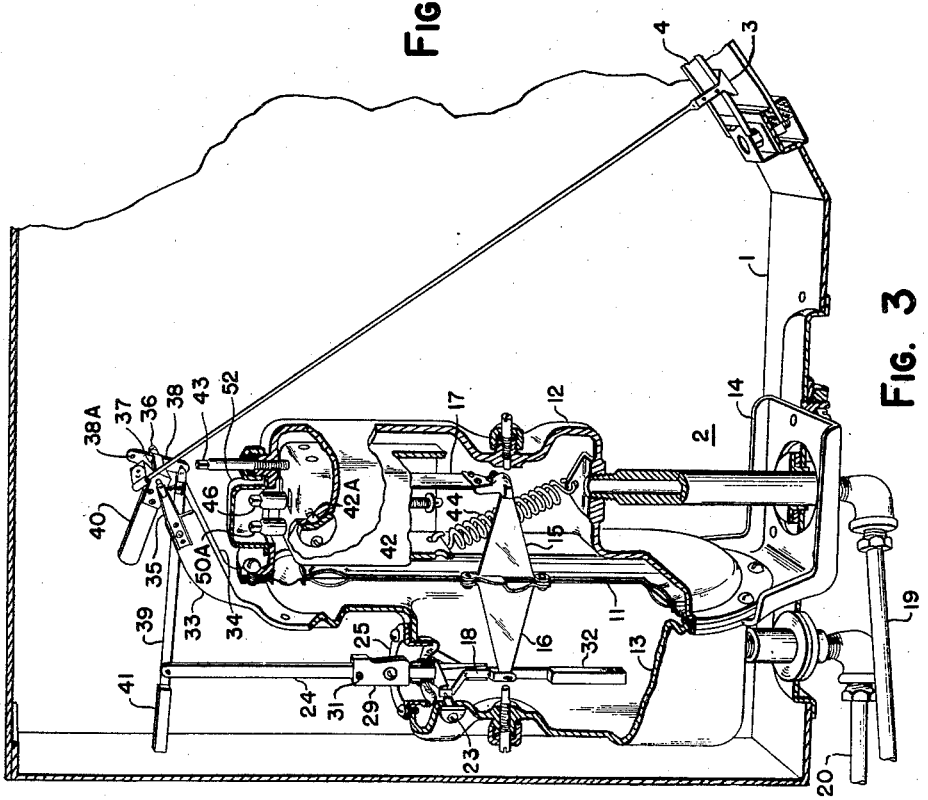
Inventor
FREDERICK A. BARNES
By Raymond D. Junkins
Attorney Dec. 19, 1939.    F. A. BARNES    2,184,163
PRESSURE GAUGE
Filed June 10, 1937    3 Sheets-Sheet 3

Inventor
FREDERICK A. BARNES
By Raymond D. Junkins
Attorney

Patented Dec. 19, 1939

2,184,163

UNITED STATES PATENT OFFICE 2,184,163

PRESSURE GAUGE

Frederick A. Barnes, Cleveland Heights, Ohio, assignor to Bailey Meter Company, a corporation of Delaware Application June 10, 1937, Serial No. 147,524

10 Claims. (Cl. 73—110)

This invention relates to devices for indicating or otherwise exhibiting the magnitude of a pressure or a pressure differential.

My invention is particularly adapted, although not limited thereto, to the measurement of relatively small pressure differences, ranging from a fraction to several inches of water or mercury.

One object of my invention is to provide a gauge having exceptional sensitivity and accuracy.

A further object is to provide a rugged gauge unaffected by atmospheric conditions found in industrial plants, and particularly a gauge which is resistant to oil, acid, caustic and heat.

Another object is to provide a gauge which may be subjected to pressures greatly beyond the range exhibited without loss of calibration or damage to the mechanism.

Still a further object is to provide a gauge easily calibrated and adjusted.

A further object is to provide a unit gauge readily adapting itself to battery mounting so that a plurality of units having identical or different ranges may be housed in a single case.

Further objects and advantages, and means whereby I accomplish such objects will be apparent from the description to follow and from the drawings in which:

Fig. 3 is an isometric illustration of a gauge embodying my invention with parts broken away to show the internal mechanism.

Fig. 4 is a fragmentary view, partially in section, of a detail shown in Fig. 3.

Fig. 5 is an isometric illustration in section, of a part of the mechanism shown in Fig. 3.

The embodiment of my invention I have chosen to illustrate is particularly adapted to the measurement of relatively small pressure differences in the order of a fraction to several inches of water or mercury. Such pressure difference may be that existing between the pressure of the atmosphere and the pressure within a confined region commonly termed, "draft". When the pressure within the confined region is greater than that of the atmosphere it is known as a positive draft. When less than that of the atmosphere as a negative draft. Again the pressure difference may be that existing between two confined regions or the difference existing between two points in the path of a flowing fluid. It will be apparent from the description to follow that my invention may be employed in the measurement of pressure differences of a high order of magnitude and that the embodiment disclosed is merely illustrative and not limiting.

Figure 2:
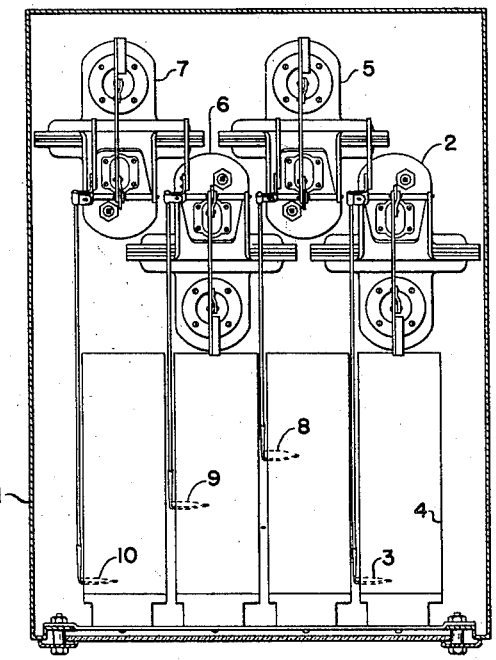
Fig. 2 is a top plan illustration of the casing and gauges shown in Fig. 1.
Figure 1:
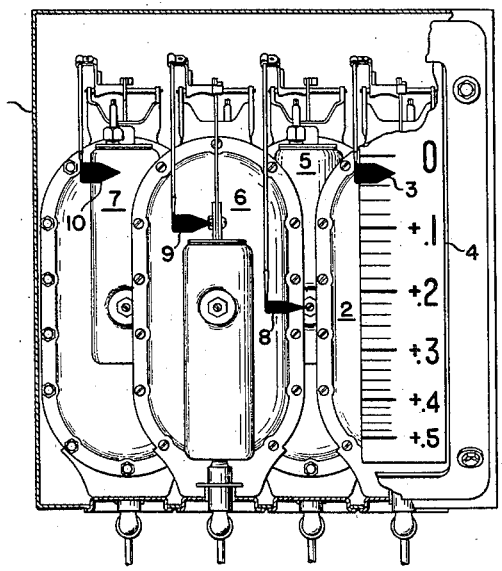
Fig. 1 is a front elevation of a casing housing a plurality of pressure gauges.

Referring to Figs. 1 and 2, I therein show a casing 1 in which is mounted a pressure responsive device generally indicated at 2 arranged to angularly position an index 3 relative to an arcuate scale 4, which may be graduated in any desired units, such as inches of water, inches of mercury, or pounds per square inch. The device 2 may also be calibrated so that the index 3 travels over the scale 4 for any desired range in pressure differences, and so that the index 3 is positioned downwardly or upwardly for increasing or decreasing pressure differences as may be desired.

For example, increasing negative drafts may be indicated by downward positioning of the index, whereas increasing positive drafts may be indicated by upward positioning of the index. In the former case, at zero draft the index will be at the top of the scale and in the latter at the bottom. In other cases the draft may vary from a positive to a negative value, and vice versa, so that the zero position of the index lies between the extreme limits of the cooperating scale, which is preferably graduated to indicate both the magnitude of the drafts and whether positive or negative. For purposes of illustration, however, I have shown the device 2 calibrated to position the index 3 downwardly or clockwise over the scale 4 for a range in pressures from 0 to +0.5 inch of water.

It is frequently advantageous to indicate a plurality of drafts or pressure differences at a central point. For example, in the operation of steam generators it is highly desirable that the operator be advised of the drafts existing at a plurality of points in the gas or air passages of the generator. Preferably such indications are all made at a centrally located point so that the relative magnitude of such drafts may readily be determined. The device 2 is readily adapted to battery mounting, and in Fig. 1 and Fig. 2 are shown devices 5, 6 and 7 similar to the device 2 arranged to angularly position indices 8, 9 and 10 respectively.

In Fig. 3 I have shown the pressure responsive device 2 in isometric projection with parts broken away so the internal mechanism is illustrated.

Separated by a pressure sensitive diaphragm assembly generally indicated at 11 are flanged pressure tight chambers 12 and 13. The chamber 13 is provided with a foot or pedestal 14 secured to the floor of the casing 1 and serving to support the device in position. The diaphragm 11 is supported in proper position by triangular shaped drive links 15 and 16, the former of which is pivotally carried at its outer end by a leaf or cantilever spring 17 and the latter of which is pivotally carried at its outer end by a member 18.

Pressures, the difference of which is to be measured, are admitted to the chambers 12 and 13 by pipes 19 and 20 respectively. Movements of the diaphragm 11 due to the difference in pressure within the chambers 12 and 13 are opposed by the spring 17, so that for every pressure difference there exists a definite position of the diaphragm 11. For example, assuming that the pressure within the chamber 12 is greater than that within the chamber 13, then the diaphragm 11 will be positioned to the left (as viewed in the drawings) until the opposing force created by the flexing of the spring 17 is equal to the force created by the action of the pressure difference on the diaphragm 11.

As shown in Fig. 4 the member 18 is symmetrical about its vertical axis and comprises laterally extending arms 19A and 20A terminating in upwardly extending pivot bearings which are joined by a horizontal base member 22. Journaled in the pivot bearings are pivots carried in the wall of the chamber 13 as indicated at 23 and 23A. Movements of the diaphragm 11 accordingly cause the member 18 to be angularly positioned about the pivots.

Secured to the member 18 between the arms 19A and 20A is a lever 24 passing through an opening in the wall of the chamber 13. Secured to the wall of the chamber 13 is a ring 25 to which is secured a flexible diaphragm 26 pressure sealing the opening in the wall while permitting the member 18 and shaft 24 to be positioned about the pivots 23. The diaphragm 26 is sealed pressure tight about the shaft 24 by means of a pliant washer 27 supported by the member 22 and held in firm engagement with the diaphragm 26 by a similar washer 28 forced downwardly by a cam wedge 29 pivoted to the member 24 by a screw 29A and engaging a cup shaped member 30. After the cam wedge 29 has been turned to the position shown, about screw 29A, a pin 31 is inserted through member 24 which prevents movement of the wedge.

The pivot bearings formed by arms 19A and 20A extend upwardly so that pivots 23 and 23A lie in the same plane as the center section of the diaphragm 26, avoiding undue flexing of the diaphragm due to angular positioning of the shaft 24. A counterweight 32 carried by the member 18 compensates for the weight of the shaft 24 so that the center of gravity of the assembly coincides with the center line of the pivots 23 and 23A. Movements of the assembly away from the vertical accordingly do not cause a reaction on the diaphragm 11 and incorrect positioning of the index 3.

The chamber 13 carries a bifurcated extension having arms 33 and 34 supporting pivot bearings 35 and 36 respectively. Pivoted in these bearings is a shaft 37 to which is secured the index 3 and an arm 38 pivotally connected to the lever 24 by a link 39. The arm 38 is provided with a pivot bearing 38A on the opposite side of the shaft 37 than that to which the link 39 is pivoted. If link 39 is pivoted in bearing 38A then movement of diaphragm 11 to the left will produce downward or clockwise movement of index 3. Secured to the shaft 37 is a counterweight 40, so that the center of gravity of the entire assembly comprising the index 3 and arm 38 may be brought to the longitudinal center line of the shaft 37. Similarly the link 39 is provided with a counterweight 41 so that its center of gravity may be brought to the pivot connection with the shaft 24. In this manner the entire moving mechanism is in static balance regardless of the position of the index 3 and varying reactions upon the diaphragm 11 are eliminated. Accordingly, the sole reactive force on the diaphragm 11 is that due to the spring 17 which, as hereinafter more fully explained, may be calibrated so that for every difference in pressure existing across the diaphragm the index 3 may be brought to a predetermined desired position relative to the scale 4.

As shown in Fig. 5 the spring 17 is secured at its upper end to a cradle 42 pivotally mounted as indicated at 42A (Fig. 3) in the chamber 12 and urged against an adjustable stop 43 by a spring 44. With equal pressures existing within chambers 12 and 13 the index 3 may be moved relative to the scale 4 by adjustment of the stop 43, or the position of the index 3 relative to the scale 4 may be varied for any pressure difference between chambers 12 and 13 by such adjustment. The range in pressure differences required to position the index 3 from one limit of the scale 4 to the other remains the same, however, regardless of the adjustment.

Within the cradle 42 is an open ended carriage 45 movable longitudinally by a screw 46 journaled in the cradle. The spring 217 passes through the carriage 45 through suitable slots. Within the carriage is a hollow rectangular cup-shaped member 47, one side of which engages the wall of the cradle 42 and the edges of which engage the spring 17. On the opposite side of the spring 17 is a similar cup shaped member 48, the edges of which engage the spring. Lying adjacent the wall of the member 48 is a hollow triangular member 49 mating with a similar member 50, having a side engaging the wall of the cradle 42. Threaded into the triangular shaped member 50 is a manually adjustable screw 50A having a collar or thrust bearing 51 located between the upper wall of the carriage 45 and triangular shaped member 49. The screw 50A passes through the carriage 45 and member 49 through an enlarged opening, so that the member 49 is free to slide laterally with respect to the member 50. Rotation of the screw 50A in one direction tends to move the member 50 upwardly causing the member 49 to move to the right as viewed in the drawings, thereby locking cup shaped members 47 and 48 against the spring 17. The triangular shaped members 49 and 50 act in other words as an expanding member upon manipulation of the screw 50A, locking the carriage 45 in the position it then occupies and causing the cup shaped members 47 and 48 to firmly engage the spring 17.

The position of the carriage 45 determines the free or effective length of the spring 17, and thereby controls or determines the range in pressure differences required to position the index 3 from the minimum graduation on scale 4 to the maximum. For example, as the carriage 45 is positioned downwardly as shown in Fig. 5, the effective length of the spring 17 decreases, thereby increasing opposition to movement of the diaphragm 11 and requiring a greater range in pressure differences to position the index 3 from minimum to maximum position. Conversely as the carriage 45 is positioned upwardly, the effective length of the spring 17 is increased, thereby decreasing the range in pressure differences required to position the index 3 from minimum to maximum position.

The carriage 45 and associated devices provide a simple and convenient means for calibrating the gauge. The index 3 is readily brought to the initial or starting position relative to the scale 4 by proper manipulation of the screw 43, and correct movement of the index 3 for a given range in pressure differences is obtained through proper manipulation of the screw 46. Excepting the time when the screw 46 is being manipulated, the screw 50A provides a convenient means for locking the carriage 45 in position and definitely setting or defining the effective length of the spring 17. A cap 52 is provided which is secured to the casing 12 after adjustment has been completed to prevent manipulation of screws 46 and 50A by unauthorized persons.

Figure 6:
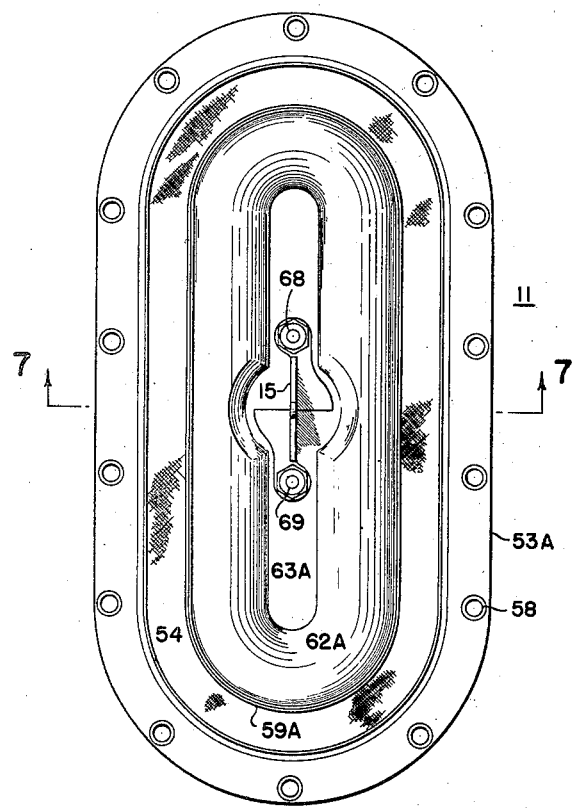
Fig. 6 illustrates a diaphragm assembly.
Figure 7:
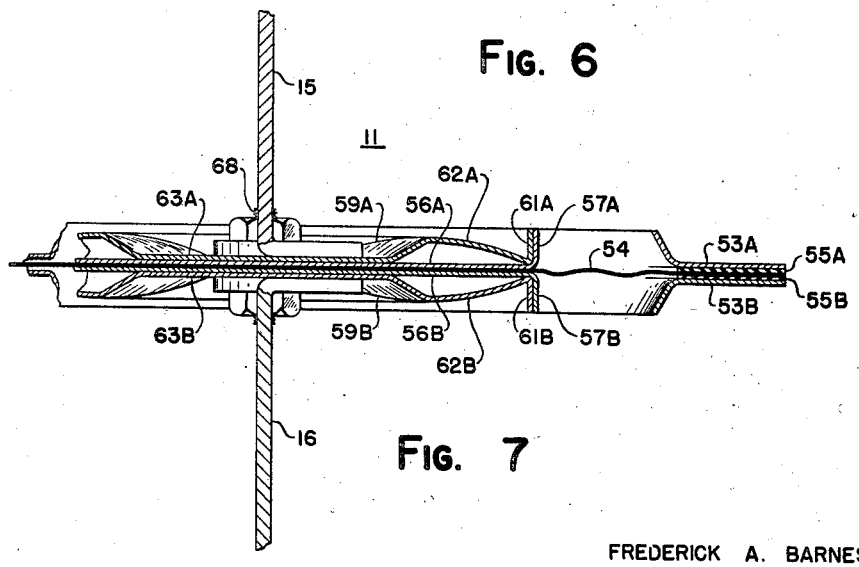
Fig. 7 is a fragmentary view to enlarged scale in cross section along the line 7—7, in the direction of the arrows, of Fig. 6.

In Figs. 6 and 7 I have illustrated in detail the pressure sensitive diaphragm assembly generally indicated at 11. The assembly is symmetrical about its longitudinal and transverse axes. Clamped between oblong shaped shrouding rings 53A and 53B is a pliant flexible pressure tight diaphragm 54 provided with sufficient slack so that it may be positioned in one direction or the other from the plane of the rings 53A and 53B in accordance with the pressure difference existing between chambers 12 and 13. Interposed between the rings 53A and 53B and diaphragm 54 are gaskets 55A and 55B. The rings 53A and 53B are provided with eyelets 58 for clamping the diaphragm 54. As shown in Fig. 3 the assembly 11 is clamped between the flanges of chambers 12 and 13 by suitable screws passing through the eyelets.

The diaphragm 54 is preferably composed of a flexible, pressure tight, yet relatively strong material having no internal resistance to flexing and impervious to acid, caustic, heat and other deleterious conditions to which it may be exposed. I have found that a suitable material is Japanese silk, which provides the strength and flexibility required, and that impregnating this material with a synthetic rubber compound, known under the trade name, "Koroseal", renders it pressure tight and impervious to deleterious conditions while maintaining its inherent flexibility.

Covering the center section of the diaphragm 54 are flat plates 56A and 56B having sharply upturned edges 57A and 57B respectively, defining the free area of the diaphragm 54. I have found that it is desirable to maintain the free area of the diaphragm, that is the section of the diaphragm flexed under the influence of pressure within sharply defined limits and of relatively narrow width. In the assembly I have illustrated, the free area consists of the band of the diaphragm 54 lying between the inner edges of the rings 53A and 53B and the upturned edges 57A and 57B of plates 56A and 56B. In this manner the effective area of the diaphragm throughout its range of movement is maintained constant so that equal changes in pressure differences result in equal movements of the index 3.

So that the edges 57A and 57B will firmly clamp the diaphragm 54 and hence sharply define its free area, I provide clamping plates 59A and 59B. The plate 59A has an upturned edge 61A, an arc section 62A immediately adjacent thereto, and a flat center section 63A. The plate 59B is provided with a similar upturned edge 61B, arc section 62B and flat center section 63B. Plates 59A and 59B are clamped between the bases of drive links 15 and 16 by studs 68 and 69 provided with suitable cooperating nuts.

In their normal unflexed position the outer edges 61A and 61B extend beyond the center sections 63A and 63B, so that before the cooperating nuts or studs 68 and 69 are drawn up the center sections 63A and 63B do not engage plates 56A and 56B. Upon drawing up the cooperating nuts the edges 61A and 61B are urged outwardly against edges 57A and 57B and downwardly against the flat side of plates 56A and 56B, thereby effectively clamping or holding the diaphragm 54 in predetermined position. The free area of the diaphragm 54 is also sharply defined, resulting in a predetermined effective area, remaining constant throughout the range of motion of the diaphragm. Such construction also facilitates duplication of the calibration between units, so that the characteristic of any particular gauge having a certain effective spring length may be readily predicted.

As hereinbefore stated, the drive links 15 and 16 support the diaphragm 54, thereby maintaining uniform slack throughout its free area. Accordingly, bunching or binding of the diaphragm at different points in its travel is avoided, and likewise movements of the drive links 15 and 16 will be substantially perpendicular to the plane of the diaphragm, resulting in a consistant and uniform motion of the index 3.

While in accordance with the patent statutes I have illustrated and described a particular embodiment of my invention, it will be evident to those skilled in the art that it may be incorporated in various devices and is capable of different modifications. For example, the index 3 may be provided with suitable marking means so that it will give in addition to an indication of the difference in pressures existing between chambers 12 and 13 a permanent record of such difference. Accordingly, the illustrated and described embodiment should be taken as merely illustrative and not as limiting.

What I claim as new, and desire to secure by Letters Patent of the United States, is:

1. In a pressure responsive device, in combination, a cradle, a cantilever spring supported in said cradle, a pair of jaws for clamping said spring movable in said cradle along said spring, and means for urging said jaws against said spring.

2. In a pressure responsive device, in combination, a cradle, a cantilever spring secured to one end of said cradle and extending longitudinally thereof, a carriage in said cradle movable longitudinally thereof, said spring passing through said carriage, jaw members carried by said carriage for clamping said spring, and means for urging said jaws against said spring.

3. In a pressure responsive device, in combination, a cradle, a cantilever spring secured to one end of said cradle and extending longitudinally thereof, a carriage in said cradle movable longitudinally thereof, said spring passing through said carriage, a rectangular cup shaped jaw member on either side of said spring supported in said carriage, and a movable wedge supported in said carriage for urging said jaw members against said spring.

4. In a pressure responsive device, in combination, a cradle, pivoted means for positioning said cradle, a cantilever spring secured to the end of said cradle adjacent said pivots and extending longitudinally thereof, a carriage in said cradle and movable longitudinally thereof said spring passing through said carriage, a rectangular cup shaped jaw member on either side of said spring, a pair of triangular shaped members lying adjacent one of said jaws, and means for moving said triangular shaped members relative to one another to urge said jaw members against said spring.

5. In a pressure responsive device, in combination, a vertically disposed diaphragm sensitive to the pressure, a horizontal beam secured to said diaphragm and extending transversely on either side thereof, a vertically disposed spring pivotally connected to one end of said beam for producing a displacement of said diaphragm in accordance with changes in the pressure extending at right angles to said beam and forming a support therefor, and a vertically disposed member oscillatable about a fixed pivot extending at right angles to said beam pivotally connected to the other end of said beam and forming a second support therefor, whereby said diaphragm is supported and held in predetermined vertical position by said beam.

6. In a pressure responsive device, in combination, a pivot, a cradle supported on said pivot and positionable about said pivot, a cantilever spring secured to the end of said cradle adjacent said pivot and extending longitudinally thereof, an open ended carriage extending transversely in said cradle and movable longitudinally therein, said spring passing through said carriage, a rectangular cup shaped jaw member in said carriage between said spring and the wall of said carriage, a similar cup shaped jaw member in said carriage on the opposite side of said spring, a pair of triangular shaped members in said carriage between said last named jaw member and a wall of said cradle, and means for moving said triangular members relative to each other to wedge said jaw members against said spring.

7. In a pressure responsive device, in combination, a pivot, a cradle supported on said pivot and positionable about said pivot, a leaf spring secured to the end of said cradle adjacent said pivot and extending longitudinally thereof, an open ended carriage extending transversely in said cradle and movable longitudinally therein, said spring passing through said carriage, a rectangular cup shaped jaw member in said carriage between said spring and the wall of said carriage, a similar cup shaped jaw member in said carriage on the opposite side of said spring, a pair of triangular shaped members in said carriage between said last named jaw member and the wall of said cradle and forming expansible means for forcing said last named jaw member toward said spring.

8. In a pressure responsive device, in combination, a pair of pressure receiving chambers, a movable pressure sensitive diaphragm separating said chambers, a beam secured to said diaphragm and extending perpendicularly thereof into said chambers, a spring in one of said chambers pivotally connected to said beam and forming a support therefor, a shaft in the other of said chambers pivotally connected to said beam and forming a support therefor, said shaft extending through an opening in a wall of said chamber, a pivoted support for said shaft located at said opening, a pliant pressure tight shield between said shaft and said wall, and an indicator of the position of said diaphragm actuated by said shaft.

9. In a pressure responsive device, in combination, a movable pressure sensitive diaphragm, a beam secured to substantially the midpoint of said diaphragm and extending perpendicularly on either side thereof, a cantilever spring for opposing motion of said diaphragm connected to said beam on one side of said diaphragm and extending at right angles to said beam, a cradle for supporting said spring, a pivoted support for said cradle, means for positioning said cradle about said support, a carriage in said cradle and movable longitudinally of said spring, a pair of jaws for clamping said spring carried by said carriage, manually operated means for urging said jaws against said spring and cradle to lock said carriage in position, a shaft pivotally connected to said beam on the opposite side of said diaphragm and extending at right angles to said beam, a pivoted support for said shaft, and an indicator of the position of said diaphragm actuated by said shaft.

10. In a pressure responsive device, in combination, a calibrating element comprising a cantilever spring supported at one end, a pair of jaws movable longitudinally along said spring for varying the effective length thereof, means for moving said jaws longitudinally along said spring, and means for clamping said jaws against said spring when in any position relative to said spring.

FREDERICK A. BARNES.